(12) United States Patent
Dagonneau

(10) Patent No.: US 7,775,892 B2
(45) Date of Patent: Aug. 17, 2010

(54) ENDPIECE FOR A WELDED TUBE SHAFT AND A CORRESPONDING SHAFT

(75) Inventor: Pascal Dagonneau, Sable sur Sarthe (FR)

(73) Assignee: GKN Driveline S.A., Carrieres-sous-Poissy (FR)

( * ) Notice: Subject to any disclaimer, the term of this patent is extended or adjusted under 35 U.S.C. 154(b) by 306 days.

(21) Appl. No.: 11/775,272

(22) Filed: Jul. 10, 2007

(65) Prior Publication Data

US 2008/0044223 A1 Feb. 21, 2008

(30) Foreign Application Priority Data

Jul. 10, 2006 (FR) .................................. 06 06262

(51) Int. Cl.
*F16D 1/068* (2006.01)
(52) U.S. Cl. ...................................... 464/182; 464/902
(58) Field of Classification Search ................. 464/134, 464/180–184, 902; 403/270, 271
See application file for complete search history.

(56) References Cited

U.S. PATENT DOCUMENTS

| 2,848,882 | A | 8/1958 | Larsen et al. |
| 4,211,589 | A | 7/1980 | Fisher et al. |
| 7,015,435 | B2 | 3/2006 | Yablochnikov |
| 2003/0050127 | A1* | 3/2003 | Barrett et al. ............... 464/180 |

FOREIGN PATENT DOCUMENTS

| DE | 196 07 921 A1 | 9/1997 |
| JP | 60 168911 | 9/1985 |

OTHER PUBLICATIONS

1984 French industry standard AFNOR A 35-556 as filed by the inventor Feb. 26, 2010.*

* cited by examiner

*Primary Examiner*—Greg Binda
(74) *Attorney, Agent, or Firm*—Rader, Fishman & Grauer PLLC

(57) ABSTRACT

A shaft includes endpieces welded to a tube shaft. The endpieces include a central axis; a first portion having a first end that is a connection end; and a second portion that is tubular and that is adapted to be welded to the tube. The second axial portion defines a second free end and has an outer surface, an inner surface, and an end-wall surface defined by an end-wall generatrix. The inner surface is of a shape that flares towards the second free end and is defined by an inner generatrix different from the end-wall generatrix. The endpiece is applicable to transmission shafts in motor vehicles.

14 Claims, 2 Drawing Sheets

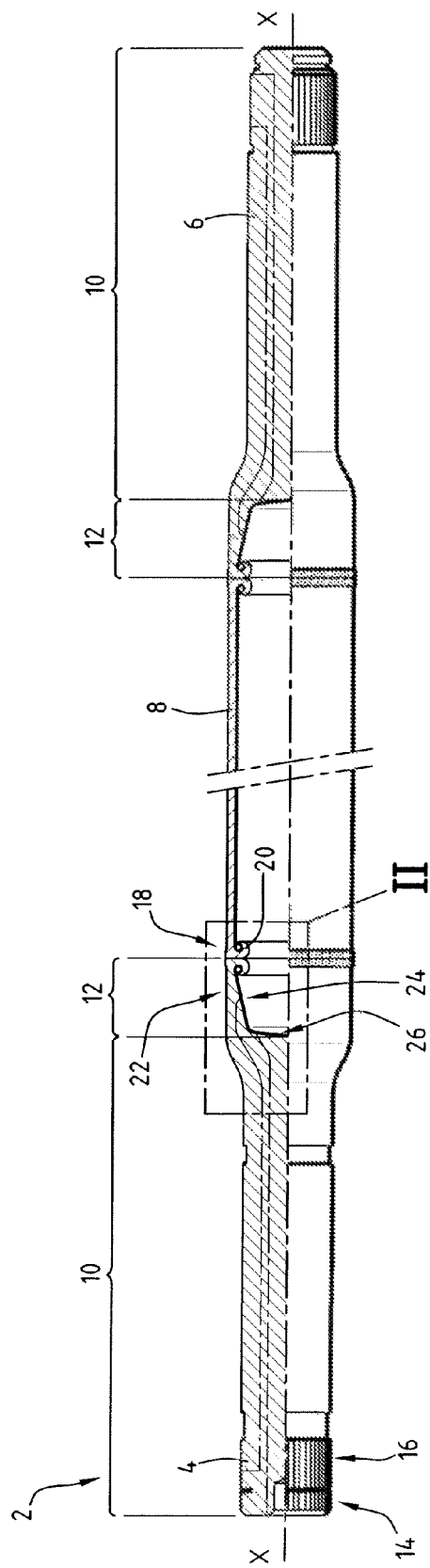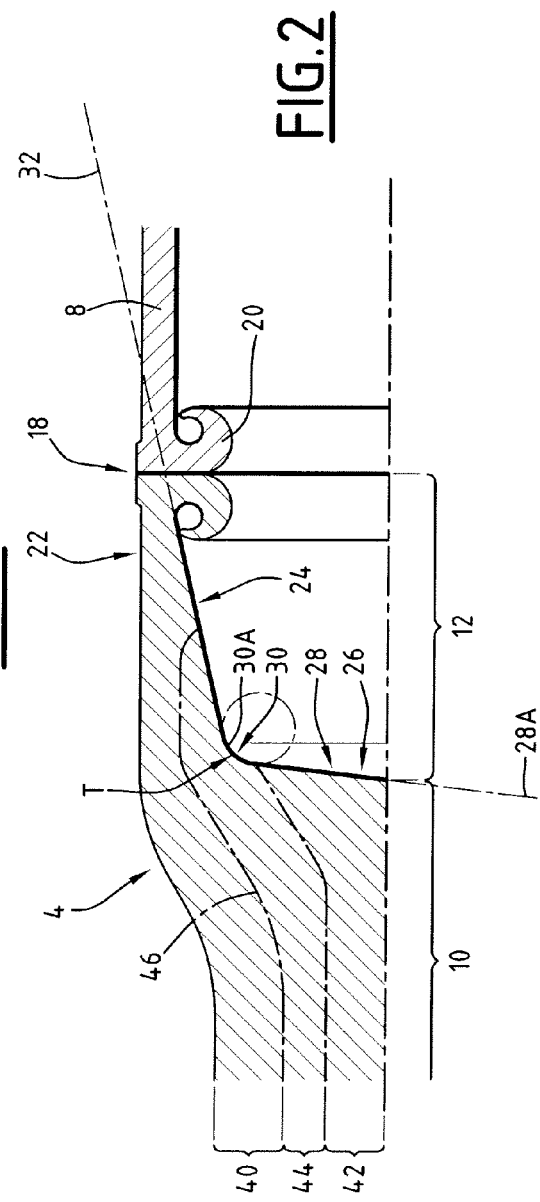

ENDPIECE FOR A WELDED TUBE SHAFT AND A CORRESPONDING SHAFT

TECHNICAL FIELD

The present invention relates to an endpiece for a welded tube shaft, of the type comprising a central axis, a first axial portion having a first end that constitutes a connection end, a second axial portion that is tubular and that is adapted to be welded to a tube, the second axial portion defining a second end, and presenting an outer surface, an inner surface, and an end-wall surface defined by an end-wall generatrix. The invention applies more particularly to connection shafts in motor vehicle transmissions.

BACKGROUND OF THE INVENTION

In the state of the art, welded tube shafts are known that are constructed of two endpieces each welded to one and of a hollow tube. Each endpiece comprises a first portion provided with connection fluting such as splines. The splines are adapted to connect the shaft, for example to a correspondingly splined inner joint part of a constant velocity joint. Each endpiece has a tubular second portion that is welded to the hollow tube. The second portion has an inner surface that is cylindrical and an end-wall surface that is substantially flat. The cylindrical inner surface is connected to the end-wall surface via a surface forming a portion of a torus.

During fabrication, the endpieces of known welded tube shafts are subjected to normalization annealing which leads to local decarburization of the endpiece at the location of the surface in the form of a portion of a torus.

Furthermore, after welding, the welded tube shaft is subjected to induction heat-treatment that creates a heat-treated zone in the outer portion of the shaft and a zone that is not heat-treated situated inside the endpieces, with the two zones being separated by a line of separation. Usually, the line of separation is terminated at the surface in the form of a portion of a torus.

Because of those various fabrication parameters, the structural stability and the service lifetime of the known shaft are compromised.

SUMMARY OF THE INVENTION

An object of the invention is thus to increase the structural stability and the service lifetime of a welded tube shaft, while still enabling manufacture to be inexpensive.

To this end, the invention provides an endpiece of the above-specified type, wherein the inner surface is of a shape that flares towards the second and is defined by an inner generatrix that is different from the end-wall generatrix.

In particular embodiments, the endpiece of the invention includes one or more of the following characteristics: the end-wall generatrix has an end-wall radius of curvature, and the inner generatrix has a radius of curvature that is greater than the end-wall radius of curvature; the end-wall generatrix has an end-wall radius of curvature, and the inner generatrix is rectilinear, such that the inner surface is frustoconical in shape; the angle of inclination of the inner generatrix relative to the central axis is at least 1° and at most 60° relative to the central axis, and is preferably at least 10° and at most 50°; the end-wall surface comprises an end portion connected to a transition portion in the form of a portion of a torus, and the end-wall generatrix is made up in part of an end-wall generatrix defining the end portion and in part of a transition generatrix defining the transition portion; the endpiece is made of steel and has an outer zone that is heat-treated and an inner zone of material structure that is different from the material structure of the outer zone, which zones are separated by a line of separation, and the line of separation terminates at the inner surface; the inner surface is a zone that is not heat-treated or an intermediate zone, in particular a zone of bainite; the heat-treatment is heat-treatment by induction; the endpiece is cold-forged without annealing; and the first end is a fluted end or a tulip or a bell of a constant velocity joint.

The invention also provides a shaft of the type comprising two endpieces and a tube extending between the two endpieces, the two endpieces being welded to the tube by forming a bead of welding on each, wherein at least one of the endpieces is an endpiece as defined above.

In particular embodiments, the shaft of the invention includes one or more of the following characteristics: the endpiece is an endpiece as defined above, and the heat-treated outer zone extends beyond the bead of welding, the tube being heat-treated over its entire cross-section and over its entire length; and one or each endpiece is an endpiece of boron steel, such as 38B3 steel, and the tube is made of a steel having a carbon content that is different, in particular less than that of the steel of the endpiece, such as 34MnB5 steel.

The invention also provides a method of fabricating a shaft as defined above and comprising the following successive steps: securing the two endpieces to the tube by welding so as to obtain a shaft blank; turning and machining the endpieces; and passing the shaft blank through an induction coil at a varying treatment speed; the treatment speed while heat-treating the beads of welding and the tube being faster than the treatment speed while treating the endpieces.

These and other features and advantages of this invention will become more apparent to those skilled in the art from the detailed description of a preferred embodiment. The drawings that accompany the detailed description are described below.

BRIEF DESCRIPTION OF THE DRAWINGS

The invention can be better understood on reading the following description given purely by way of example and made with reference to the accompanying drawing, in which:

FIG. 1 is a view partially in section of a shaft of the invention; and

FIG. 2 is an enlarged view of a detail II of FIG. 1.

DETAILED DESCRIPTION OF A PREFERRED EMBODIMENT

Figure 3:
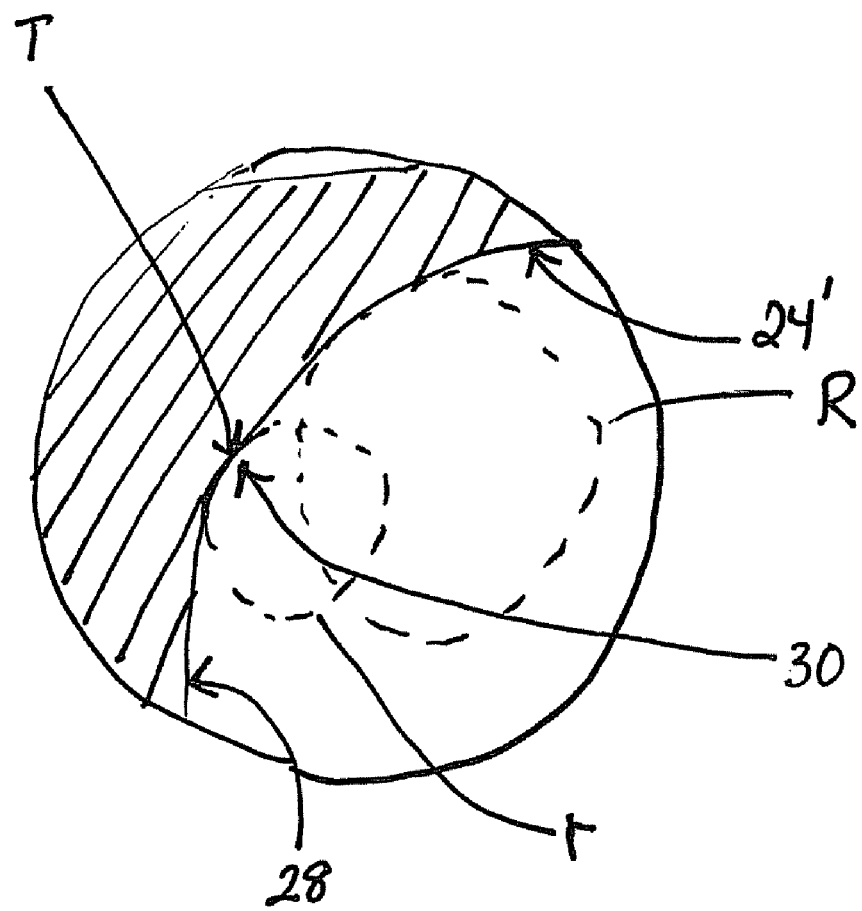
FIG. 3 is an enlarged view of a portion of FIG. 2 illustrating a variant of the shaft.

FIG. 1 is partially in section and shows a welded tube shaft of the invention, given overall reference 2.

The welded tube shaft 2 is made up of two endpieces 4 and 6 together with a central tube 8.

The two endpieces 4 and 6 are identical, at least so far as the characteristics described below are concerned. Consequently, reference is made below only to the endpiece 4.

The welded tube shaft 2 defines a central axis X-X. Below, terms such as "axially" and "radially" are used relative to said central axis X-X.

The endpiece 4 comprises a first axial portion 10 and a second axial portion 12.

The first axial portion 10 has a first end 14 that is an end for connection to a complementary element, for example a tripod joint (not shown). For this purpose, the connection end 14 is provided with connection fluting 16 which in this example is a spline.

The second axial portion 12 is tubular in shape about the axis X-X. The second portion 12 defines a second end 18. In the non-assembled state of the endpiece, this end 18 is a free end, while in the assembled state it is connected to the tube 8 by means of a bead of welding 20, which is preferably a bead of friction welding. The second axial portion 12 defines a radially-outer surface 22 and a radially-inner surface 24, together with an end-wall surface 26 (see FIG. 2).

The end-wall surface 26 is defined by a substantially flat axial end portion 28 and an axial transition portion 30. The axial end portion 28 is substantially perpendicular to the axis X-X and it is defined by part of an end-wall generatrix 28A (a straight line). By way of example, the end portion 28 is inclined at a maximum of 3° to 10°, such as 10°, 5°, or 3° relative to a plane extending perpendicularly to the axis X-X. In any event, the angle of inclination of that part of the end-wall generatrix 28A relative to the central axis X-X is greater than the angle of inclination of the inner generatrix 32 (see below). Furthermore, the angle of inclination of the generatrix 28A is limited by a plane extending perpendicularly to the axis X-X. The transition portion 30 is in the form of a portion of a torus that is generated by part of a transition generatrix 30A (an arc) having a transition radius of curvature T.

The inner structure 24 is connected to the transition portion 30 and has a rectilinear inner generatrix 32 such that the inner structure 24 is frustoconical in shape. The inner generatrix 32 is inclined relative to the central axis X-X by at least 1° and at most 60°. The inner generatrix 32 is inclined relative to the axis X-X at an angle that is preferably situated in the range 10° to 50°, and in particular in the range 20° to 40°.

These values lead to good tolerance with respect to variations in the depth of heat-treatment, and to axial latitude that is sufficient to ensure that the line of separation (see below) terminates on the inner surface 24.

The inner surface 24 extends from the transition surface 30 to the bead of welding 20. The inner surface 24 does not have any convex portions over its extent, such that it flares monotonically from the end-wall surface 26 towards the second end 18.

In a variant, shown in FIG. 3, the inner generatrix 32 may be curved with a radius of curvature R greater than the transition radius of curvature T.

The endpieces 4 and 6 are made of boron steel, such as the 1984 French industry standard AFNOR A 35-556, abbreviated as 38B3 steel and the tube 8 is made of a steel that has a different carbon content, and in particular a carbon content that is smaller than that of the sttel of the endpieces 4 and 6. By way of example, the tube 8 is made of a 34MnB5 steel. Nevertheless, it is possible to use other steels that are suitable for being subjected to heat-treatment by induction.

The endpiece 4 has a heat-treated outer zone 40 and an inner zone 42 that is not heat-treated. The outer zone 40 is constituted by martensite, for example, while the inner zone 42 is constituted by ferrite-perlite. The thermally treated and untreated zones 40 and 42 are separated by an intermediate separation zone 44. The intermediate separation zone 44 is constituted by bainite, for example. The separation zone 44 and the heat-treated zone 40 define a line of separation 46 that terminates at the inner surface 24 and is therefore situated away from the end-wall surface 26.

Furthermore, the heat-treated outer zone 40 extends from the endpiece 4 beyond the bead of welding 20 as far as the tube 8. The tube 8 is heat-treated over its entire cross-section and over its entire length, and does not have a non-treated zone 42 nor does it have an intermediate separation zone 44. In other words, the tube 8 is constituted by martensite.

In addition, the endpiece 4 is forged cold without annealing and thus does not include a decarburized zone. Consequently, the transition portion 30 does not generate a mechanical tension peak while the shaft 2 is in use, thus providing the shaft with great stability and long life.

The fact that the separation line 46 terminates at the inner surface 24 also reduces mechanical stresses in the transition zone 30 and increases the structural stability and the lifetime of the shaft 2.

The fact that the inner surface 24 slopes at a shallow angle relative to the central axis X-X makes it possible to pass the shaft 2 through an induction coil for the purpose of heat-treating the outer surface 22 while allowing for considerable tolerances in relative positioning between the shaft 2 and the induction coil.

The shaft 2 of the invention is preferably fabricated by a fabrication method comprising the following successive steps.

First, the two endpieces 2 and 4 are secured to the tube 8 by friction welding so as to obtain a shaft blank. Therefore, the shaft blank is turned and machined at its endpieces.

The shaft blank is then passed through an induction coil at varying speed for treating the endpiece.

The treatment speed during the heat-treatment of the beads of welding and of the tube is faster than the treatment speed during heat-treatment of the endpieces.

In a variant, the end 14 constitutes a tulip or a bell of a constant-velocity joint.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. An endpiece for a welded tube shaft comprising:
a central axis;
a first axial portion having a first end that constitutes a connection end;
a second axial portion that is tubular and that is adapted to be welded to a tube, the second axial portion defining a second end, and defining an outer surface, an inner surface, and an end-wall surface defined by an end-wall generatrix;
wherein the inner surface is of a shape that flares towards the second end and is defined by an inner generatrix that is different from the end-wall generatrix; and
wherein the endpiece is made of steel and has an outer zone that is heat-treated and an inner zone of material structure that is different from the material structure of the outer zone, which zones are separated by a line of separation, and wherein the line of separation terminates at the inner surface.

2. An endpiece according to claim 1, wherein the end-wall generatrix has an end-wall radius of curvature, and wherein the inner generatrix has a radius of curvature that is greater than the end-wall radius of curvature.

3. An endpiece according to claim 2, wherein the end-wall surface comprises an end portion connected to a transition portion in the form of a portion of a torus, and wherein the end-wall generatrix is made up in part of an end-wall generatrix defining the end portion and in part of a transition generatrix defining the transition portion.

4. An endpiece according to claim 1, wherein the end-wall generatrix has an end-wall radius of curvature, and wherein the inner generatrix is rectilinear, such that the inner surface is frustoconical in shape.

5. An endpiece according to claim 4, wherein the angle of inclination of the inner generatrix relative to the central axis is at least 1° and at most 60° relative to the central axis.

6. An endpiece according to claim 4, wherein the angle of inclination of the inner generatrix relative to the central axis is at least 10° and at most 50° relative to the central axis.

7. An endpiece according to claim 1, wherein the inner zone is a zone that is not heat-treated or an intermediate zone.

8. An endpiece according to claim 1, wherein the heat-treatment is heat-treatment by induction.

9. An endpiece according to claim 1, wherein the endpiece is cold-forged without annealing.

10. An endpiece according to claim 1, wherein the first end is a splined end or a tulip or a bell of a constant velocity joint.

11. A shaft of the type comprising two endpieces and a tube extending between the two endpieces, the two endpieces being welded to the tube by forming a bead of welding on each, wherein at least one of the endpieces is an endpiece according to claim 1.

12. A shaft according to claim 11, wherein one or each endpiece is an endpiece of boron steel, and wherein the tube is made of a steel having a carbon content that is less than that of the steel of the endpiece.

13. A shaft according to claim 12, wherein each endpiece comprises 38B3 steel.

14. A shaft of the type comprising two endpieces and a tube extending between the two endpieces, the two endpieces being welded to the tube by forming a bead of welding on each, wherein at least one of the endpieces is an endpiece according to claim 1, and wherein the heat-treated outer zone extends beyond the bead of welding, the tube being heat-treated over its entire cross-section and over its entire length.

* * * * *